United States Patent
Bessen et al.

(10) Patent No.: US 12,203,826 B2
(45) Date of Patent: Jan. 21, 2025

(54) METHOD FOR OPERATING AN EXHAUST GAS SENSOR

(71) Applicant: Robert Bosch GmbH, Stuttgart (DE)

(72) Inventors: Michael Bessen, Stuttgart (DE); Dorothea Welke, Stuttgart (DE); Felix Guenther, Wasserburg (DE); Maik Thiele, Stuttgart (DE); Manuel Marks, Lohr Am Main (DE); Mathias Klenk, Loechgau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 366 days.

(21) Appl. No.: 17/634,432

(22) PCT Filed: Jul. 10, 2020

(86) PCT No.: PCT/EP2020/069546
§ 371 (c)(1),
(2) Date: Mar. 25, 2022

(87) PCT Pub. No.: WO2021/032360
PCT Pub. Date: Feb. 25, 2021

(65) Prior Publication Data
US 2022/0326119 A1    Oct. 13, 2022

(30) Foreign Application Priority Data
Aug. 19, 2019 (DE) .................... 10 2019 212 393.7
Dec. 27, 2019 (DE) .................... 10 2019 220 584.4

(51) Int. Cl.
G01M 15/10    (2006.01)
G01N 37/00    (2006.01)
F02D 41/14    (2006.01)

(52) U.S. Cl.
CPC .......... *G01M 15/102* (2013.01); *G01N 37/00* (2013.01); *F02D 2041/1472* (2013.01)

(58) Field of Classification Search
CPC .............. G01M 15/102; G01M 15/104; F02D 2041/1472
See application file for complete search history.

(56) References Cited

U.S. PATENT DOCUMENTS

2008/0209886 A1   9/2008  Zillmer et al.
2016/0312681 A1   10/2016 Kamp et al.
2018/0274469 A1*  9/2018  Glugla ................ F02D 41/0245

FOREIGN PATENT DOCUMENTS

CN    101171510 A    4/2008
CN    102758696 A    10/2012
(Continued)

OTHER PUBLICATIONS

International Search Report for PCT/EP/2020/069546 Issued Oct. 22, 2020.

*Primary Examiner* — Jamel E Williams
*Assistant Examiner* — Alex T Devito
(74) *Attorney, Agent, or Firm* — NORTON ROSE FULBRIGHT US LLP; Gerard A. Messina

(57) ABSTRACT

A method for operating an exhaust gas sensor in an exhaust system of an internal combustion engine of a vehicle. The exhaust gas sensor includes a ceramic sensor element having at least one measuring electrode and a heating device. A binary dewpoint end signal is calculated, based on data which relate to the internal combustion engine and the exhaust gas sensor, which indicates whether or not the occurrence of liquid water in the exhaust system is still to be expected. Whenever the vehicle is turned off and the dewpoint end signal simultaneously has the value which signals that the occurrence of liquid water in the exhaust system is still to be expected, the sensor element is heated by its (Continued)

heating device to a temperature for a certain period of time in such a way that the sensor element dries.

15 Claims, 4 Drawing Sheets

(56) References Cited

FOREIGN PATENT DOCUMENTS

| | | | |
|---|---|---|---|
| DE | 102005041661 A1 | | 3/2007 |
| DE | 102011077697 A1 | | 12/2012 |
| DE | 102016113237 A1 | | 6/2017 |
| EP | 2260195 A1 | | 12/2010 |
| JP | H0742590 A | * | 2/1995 |
| JP | 2003083152 A | * | 3/2003 |
| KR | 100354083 B1 | * | 9/2002 |

* cited by examiner

METHOD FOR OPERATING AN EXHAUST GAS SENSOR

BACKGROUND INFORMATION

A method is already available in the related art for operating an exhaust gas sensor in an exhaust system of an internal combustion engine of a vehicle, the exhaust gas sensor including a ceramic sensor element having at least one measuring electrode and a heating device, a binary dewpoint end signal, which indicates whether or not the occurrence of liquid water is to be expected in the exhaust system, being calculated, based on data relating to the internal combustion engine and the exhaust gas sensor.

With the aid of this signal, an extremely elevated heating of the ceramic sensor element may be avoided as long as the occurrence of liquid water is still to be expected in the exhaust system. A so-called thermal shock to the ceramic sensor, which may damage it, may thus be avoided.

In the past, damaged sensor elements nevertheless sporadically occurred during the operation of the exhaust gas sensor in the exhaust system of vehicles.

SUMMARY

The present invention is directed to an understanding of the inventors that this damage may be frost damage at the ceramic sensor element, which may arise in individual cases. Namely, if a vehicle is turned off in a state in which the ceramic sensor element is wet, i.e., water adheres to the sensor element on the surface or in pores, and a cooling of the sensor element subsequently occurs below the freezing point of the water, the latter freezes, and the increase in volume associated therewith is the cause of a potential damage to the sensor element.

Based on the understanding of this damage mechanism, it is provided according to the present invention that whenever the vehicle is turned off and the dewpoint end signal simultaneously has the value which signals that the occurrence of liquid water in the exhaust system is still to be expected, the sensor is heated by its heating device to a temperature for a certain period of time in such a way that the sensor element dries at least on its surface or even completely.

In accordance with an example embodiment of the present invention, the provision includes the possibility that a heating of the sensor element is begun following the point in time at which the vehicle was turned off, i.e., the sensor was not previously heated, as well as the possibility that the sensor element was already heated prior to turning off the vehicle (for example, also with the goal of drying the sensor element, for example around 150° C. to 300° C. or around 175° C. to 250° C.) and is further heated after the vehicle is turned off (for example further around 150° C. to 300° C. or around 175° C. to 250° C.)

As a result, the sensor element dries and, even if the exhaust gas sensor is exposed to low temperatures at a later point in time, frost damage may not occur, since no or only very little liquid water is still present at the sensor element or in pores of the sensor element.

In accordance with an example embodiment of the present invention, it may be provided that, when the vehicle is turned off and the dewpoint end signal simultaneously has the value which signals that the occurrence of liquid water in the exhaust system is still to be expected, the measure is taken only under the prerequisite that a further condition is met or only under the prerequisite that multiple further conditions are met, that the sensor element is heated by its heating device to a temperature for a certain period of time in such a way that the sensor element dries at least on its surface or even completely.

A further condition may be one of the following conditions:
  a) a battery voltage of a battery, which is electrically connected to the exhaust gas sensor, is within a permissible range, for example above 12 V or above 12.4 V;
  b) the ambient temperature is below 5° C.;
  c) the total operating time of the exhaust gas sensor is not more than 100 hours or not more than 300 hours;
  d) a shunt current, which was determined in a previous measuring phase, is no more than 1 μA.

Multiple further conditions may be the following conditions: a, b, c and d; a, b and c; a, b and d; a and b; a, c and d; a and c; a and d; b, c and d; b and c; b and d; c and d.

One refinement of the method of the present invention provides that the described measure is taken even if, upon turning off the vehicle, the dewpoint end signal has the value which signals that the occurrence of liquid water in the exhaust system is no longer to be expected, but the measurement request signal simultaneously has the value which signals that the exhaust gas sensor is not to carry out an exhaust gas measurement at the moment. In this case as well, the drying safely prevents later frost damage to a possibly still damp sensor element.

One refinement of the method of the present invention provides that the described measure is, however, not taken even if, upon turning off the vehicle, the dewpoint end signal has the value which signals that the occurrence of liquid water in the exhaust system is no longer to be expected, but the measurement request signal simultaneously has the value which signals that the exhaust gas sensor is to carry out an exhaust gas measurement at the moment. In this case, it may be assumed that the sensor element is dry, and it would also be counterproductive to intervene, into the measurement presently to be carried out, by heating.

The certain period of time may be at least 40 seconds or at least 50 seconds or even at least 100 seconds, and/or the temperature may be at least 150° C., for example 150° C. to 300° C. For example, it may be provided that the temperature is held to a constant value during the certain period of time, in particular regulated.

Turning off the vehicle conceptually initially presupposes that the vehicle comes to a standstill, and the internal combustion engine is stopped. Moreover, in particular, further measures are necessary, which make it possible to recognize that the travel and/or the operation of the internal combustion engine is not to be resumed within a short period of time. For example, this may be expressed by the manual or automated opening of an ignition switch, for example with the aid of an ignition key or by similar measures. For example, at least one control unit of the vehicle may start an idling phase, which precedes in time and prepares for the complete or extensive shutdown of this control unit. Simply stopping the internal combustion engine within the scope of an automatic start/stop mode or a purely electrical drive phase in a hybrid vehicle does not represent a turning off of the vehicle within the meaning of the present invention.

The exhaust gas sensor may be, for example, a particle sensor, whose measuring function is to collect particles at the surface of the sensor element and to evaluate their electrical conductivity. The measuring function of the particle sensor may further provide that a regeneration of the sensor element precedes the collection of particles in time, in which the latter is heated to such a high degree that particles adhering thereto, in particular soot particles, burn off.

The heating element of the sensor element may be, for example, an electrical resistance structure which may be contacted from the outside.

The present invention also relates to a computer program, which is configured to carry out the steps of the method according to the example embodiment(s) of the present invention, as well as an electronic control unit, which includes a nonvolatile memory, on which a computer program of this type is stored.

BRIEF DESCRIPTION OF THE DRAWINGS

An exemplary embodiment of the present invention is described in detail below with reference to the figures.

DETAILED DESCRIPTION OF EXAMPLE EMBODIMENTS

Figure 1:
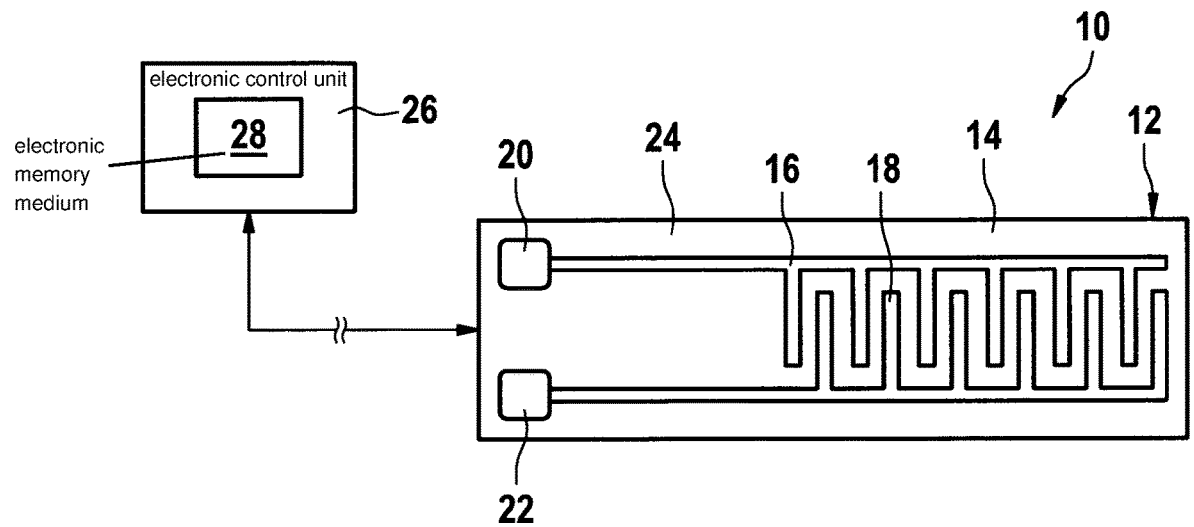
FIGS. 1 and 2 show a particle sensor, which is connected to an electronic control unit.

FIG. 1 shows a top view of a particle sensor 10 for detecting particles in a measuring gas according to one specific embodiment of the present invention. Particle sensor 10 is designed, in particular, to detect soot particles in a gas flow, for example an exhaust gas flow of an internal combustion engine, and to be installed in an exhaust system of a motor vehicle. For example, particle sensor 10 is designed as a soot sensor and may be situated downstream from a soot particle filter of a motor vehicle, which includes a diesel combustion unit. In the illustrated example, the measuring gas is an exhaust gas of an internal combustion engine of a vehicle.

Particle sensor 10 includes a sensor element 12. Sensor element 12 includes a substrate 14. Substrate 14 is manufactured, for example, from a ceramic material. Substrate 14 is provided with an essentially cuboid design. Sensor element 12 furthermore includes a first electrode 16, a second electrode 18, a first supply line 20 and a second supply line 22. First electrode 16, second electrode 18, first supply line 20 and second supply line 22 are situated on an upper side 24 of substrate 14. First electrode 16 and second electrode 18 are designed as interdigital electrodes. First electrode 16 is connected to first supply line 20. Second electrode 18 is connected to second supply line 22. First supply line 20 and second supply line 22 represent connecting contacts, which are designed to electrically contact first electrode 16 and second electrode 18.

First electrode 16 and second electrode 18 are designed to carry out a current and/or voltage measurement.

Figure 2:
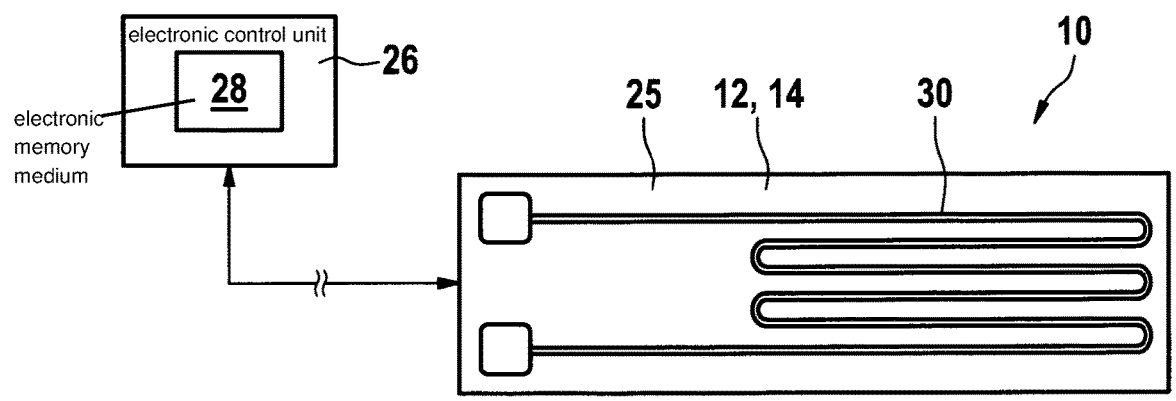

Particle sensor 10 includes a heating element 30 on its underside 25, which is shown in FIG. 2.

Electronic control unit 26 is, for example, an engine control unit of an internal combustion engine. The electronic control unit includes an electronic memory medium 28, on which a computer program is stored. The computer program contains instructions for carrying out a method for operating particle sensor 10. A method of this type is described in greater detail below with reference to FIG. 3.

Figure 3:
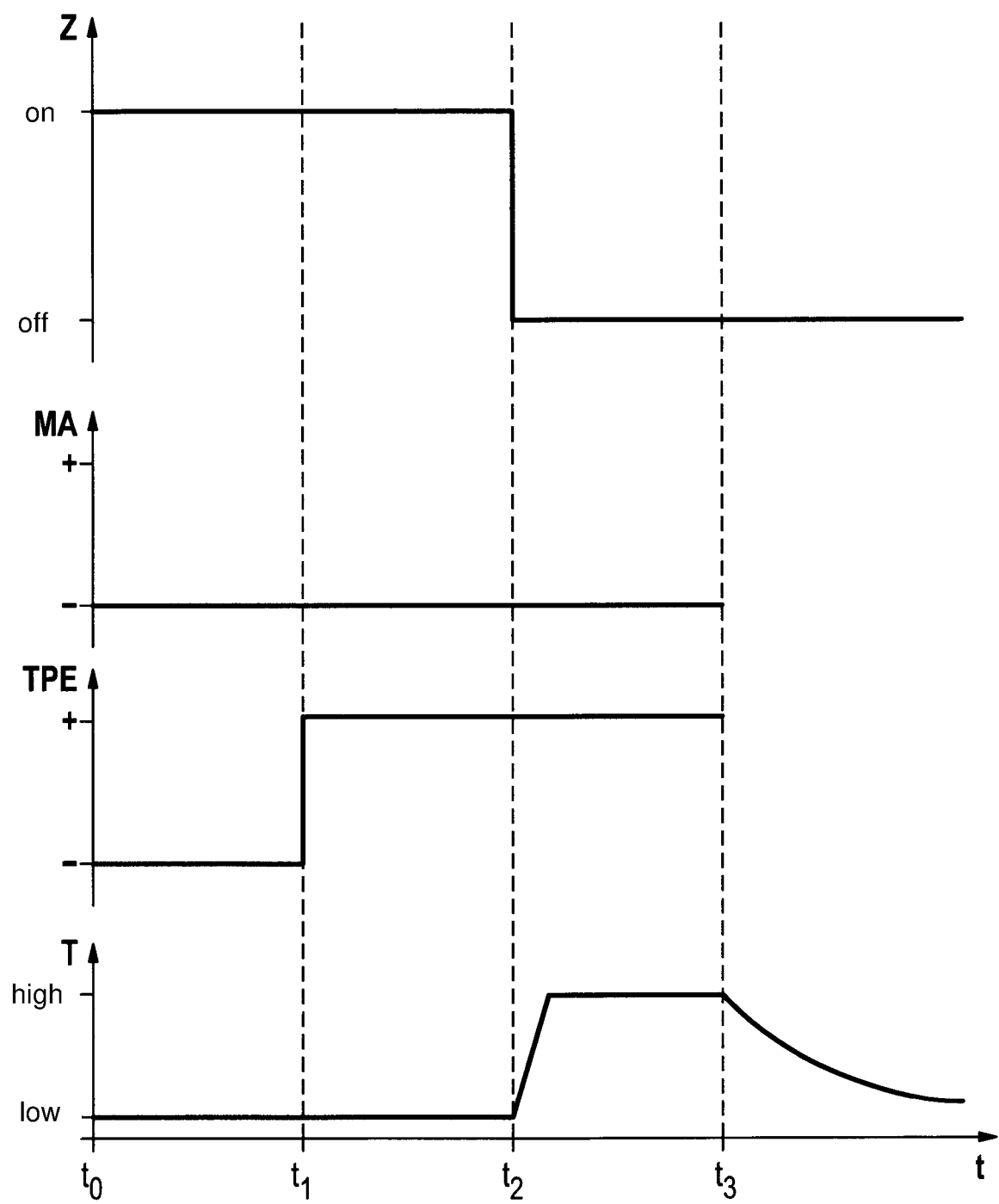
FIG. 3 shows an example of carrying out the method according to the present invention.

Temperature T of sensor element 12 is illustrated in FIG. 3 in a time sequence, which ranges from a temporally preceding point in time t0 to a temporally subsequent point in time t3; it may assume, for example, the values of low (for example, 20° C.) and high (for example, 200° C.). The binary signals of dewpoint end (TPE) and measurement request (MA) are also shown. The dewpoint end signal may, on the one hand, assume the value "−", which means that the occurrence of liquid water in the exhaust system is still to be expected, and, on the other hand, assume the value "+", which means that the occurrence of liquid water in the exhaust system is no longer to be expected. The measurement request signal may, on the one hand, assume the value "−", which means that no exhaust gas measurement is to be carried out at present and, on the other hand, assume the value "+", which means that an exhaust gas measurement is to be carried out at present. The state of the ignition of the vehicle is furthermore shown. The ignition has the state "on", which means that an ignition switch is closed and the internal combustion engine is in operation or may be immediately placed into operation, and the vehicle is not turned off. The ignition also has the state "off", which means that an ignition switch is opened, for example an ignition key of the vehicle has been removed from the ignition lock of the vehicle, and the internal combustion engine is not in operation or may not be immediately placed into operation, and the vehicle is thus turned off within the meaning of the present invention.

The ignition is switched on at point in time t0, which precedes the observed time sequence. No measurement request is present, the dewpoint end signal signals that water condensation in the exhaust system must still be taken into account. Sensor element 12 has a low temperature.

At subsequent point in time t1, it is calculated that water condensation in the exhaust system no longer has to be taken into account. However, a measurement request is not yet present.

At subsequent point in time t2, the vehicle is turned off, which is expressed in that the ignition is switched off.

Since one of the conditions is met, that either TPE=− or (TPE=+ and MA=−), turning off the vehicle has the result that sensor element 12 is heated by its heating unit 30 to a temperature T for a certain period of time in such a way that sensor element 12, for example, dries out completely. In the example, temperature T is the value 200° C.; the certain period of time is, for example, 60 seconds. For example, temperature T is held constant for the certain period of time by regulation.

At subsequent point in time t3, the certain period of time has elapsed, sensor element 12 is then, for example, completely or partially dried and is subsequently no longer heated. It thus cools off.

Even if sensor element 12 is subsequently cooled to below 0° C., this is certainly not critical, since no liquid water is present at its surface or in pores of sensor element 12.

Figure 4:
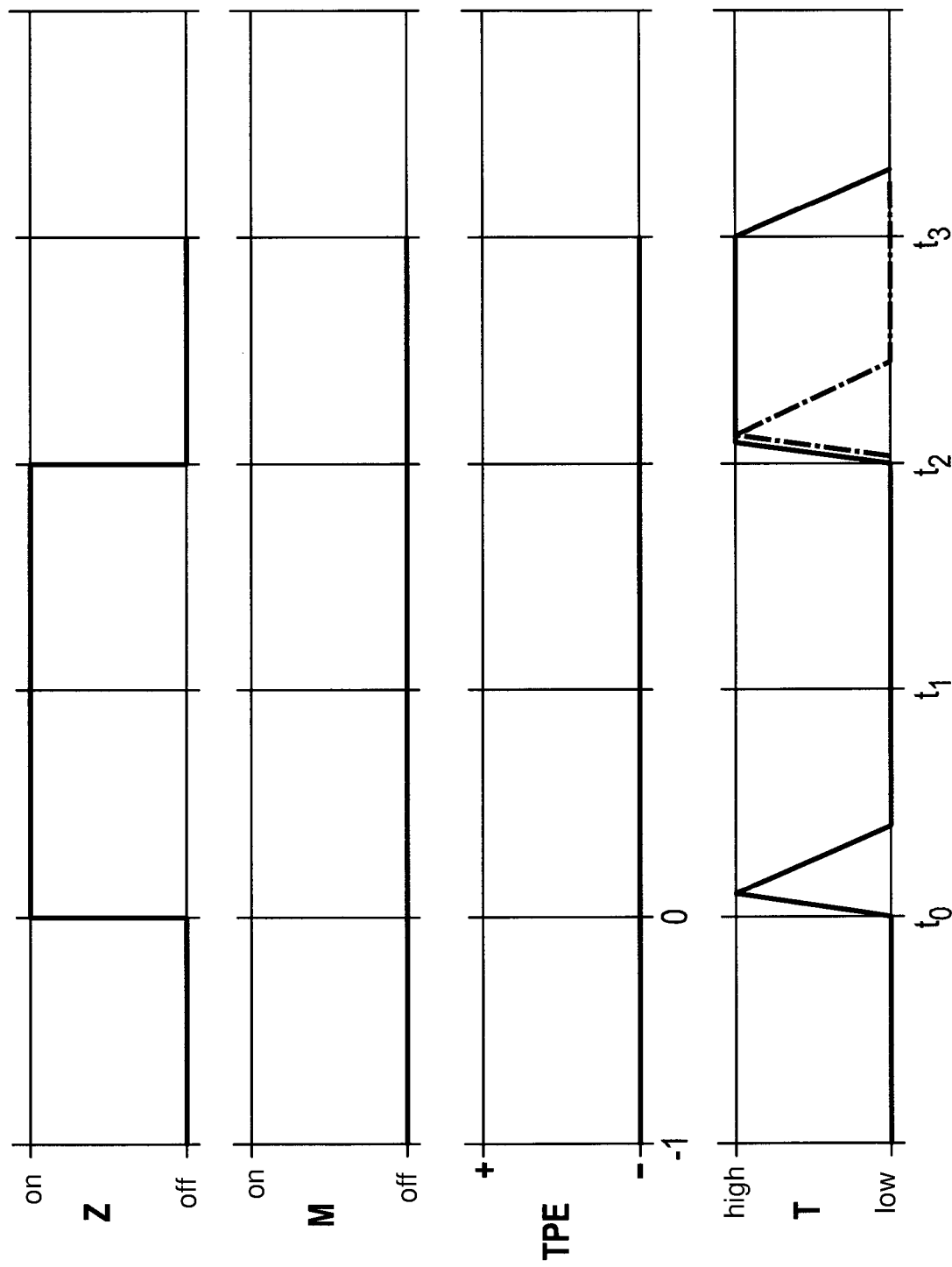
FIGS. 4 and 5 show further examples of carrying out the method according to the present invention.

Like in FIG. 3, temperature T of sensor element 12 is illustrated in FIG. 4 in another time sequence, which ranges from a temporally preceding point in time t0 to a temporally subsequent point in time t3. The binary dewpoint end signal (TPE) is also illustrated, like in FIG. 3. Ignition Z may assume the states "on" and "off", as explained above. In addition, the engine designed as an internal combustion engine may assume the states "on" and "off", depending on whether or not it is in combustion engine operation.

The ignition is switched on at point in time t0, which precedes the observed time sequence. However, the engine remains off. In response thereto, the sensor element may be optionally heated for a very short period of time, for example to verify the general functional capability of its heating device.

At subsequent point in time t1, ignition Z continues to be on, engine M continues to be off, the dewpoint end signal signals that water condensation in the exhaust system must still be taken into account. At this point in time, sensor element 12 has already cooled back down to a low temperature T.

At subsequent point in time t2, the vehicle is turned off, which is expressed in that ignition Z is switched off.

Since one of the conditions is met, that either TPE=− or (TPE=+ and MA=−), turning off the vehicle has the result that sensor element 12 is heated by its heating unit 30 to a temperature T for a certain period of time in such a way that sensor element 12, for example, dries out completely. In the example, temperature T is the value 200° C.; the certain period of time is, for example, 60 seconds. For example, temperature T is held constant for the certain period of time by regulation.

At subsequent point in time t3, the certain period of time has elapsed, sensor element 12 is then, for example, completely or partially dried and is subsequently no longer heated. It thus cools off.

Even if sensor element 12 is subsequently cooled to below 0° C., this is certainly not critical, since no liquid water is present at its surface or in pores of sensor element 12.

A conventional strategy is also plotted in FIG. 4 (dash-dot line), according to which the sensor element may be heated for a very short period of time after turning off the vehicle (point in time t3), for example to verify the general functional capability of its heating device.

Figure 5:
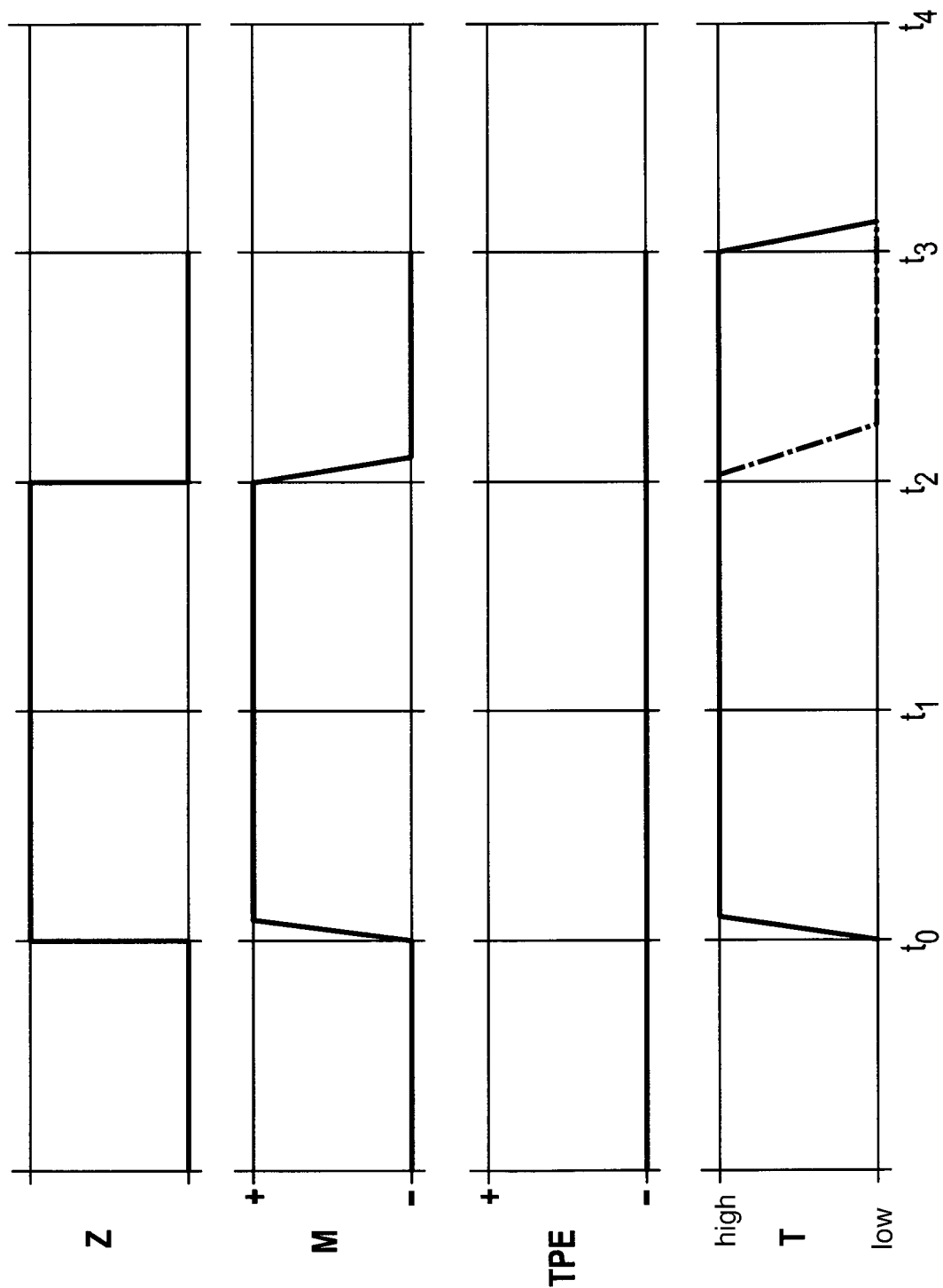

Yet another time sequence is shown in FIG. 5. It differs from the one shown in FIG. 4, first of all, in that in addition to the closing of the ignition circuit, the combustion engine operation of the engine is also started at point in time to. In response hereto, the sensor element is heated to an elevated temperature, for example 200° C.

The ignition circuit is opened again at point in time t2, and the engine is turned off. The vehicle is thus turned off. At this point in time t2, the dewpoint end signal continues to signal that water condensation in the exhaust system must still be taken into account.

While it is provided according to a conventional strategy to deactivate the heating of the sensor element at point in time t2 so that it cools down (dash-dot line), in applying the strategy according to the present invention, it is instead provided to continue heating the sensor element up to point in time t3, at which sensor element 12 is then, for example, completely or partially dried, for example for 50 seconds.

Even if sensor element 12 is subsequently cooled to below 0° C., this is certainly not critical, since no liquid water is present at its surface or in pores of sensor element 12.

It may be provided that conditions exist, which must be met to actually carry out a sensor drying of this type. Such conditions may be:

a battery voltage of a battery, which is electrically connected to the exhaust gas sensor, is within a permissible range, for example above 12 V or above 12.4 V;

the ambient temperature is below 5° C.;

the total operating time of the exhaust gas sensor is no more than 100 hours (e.g., if the dewpoint end signal (TPE) has the value which signals that the occurrence of liquid water in the exhaust system is still to be expected) or is no more than 300 hours (e.g., regardless of which value the dewpoint end signal (TPE) has);

a shunt current, which was determined in a previous measuring phase, is no more than 1 μA.

What is claimed is:

1. A method for operating an exhaust gas sensor in an exhaust system of an internal combustion engine of a vehicle, the exhaust gas sensor including a ceramic sensor element having at least one measuring electrode and a heating device, the method comprising the following steps:

calculating, based on data relating to the internal combustion engine and the exhaust gas sensor, a binary dewpoint end signal, which indicates whether or not an occurrence of liquid water in the exhaust system is to be expected; and heating, whenever the vehicle is turned off and the dewpoint end signal simultaneously has a value which signals that the occurrence of liquid water in the exhaust system is still to be expected, the sensor element by the heating device to a temperature for a certain period of time in such a way that the sensor element dries, wherein, whenever the vehicle is turned off and the dewpoint end signal simultaneously has the value which signals that the occurrence of liquid water in the exhaust system is no longer to be expected, and the measurement request signal simultaneously has the value which signals that the exhaust gas sensor is to carry out an exhaust gas measurement at present, the sensor element is no longer heated by the heating device.

2. The method as recited in claim 1, wherein, based on predefined criteria, a binary measurement request signal is calculated, which indicates whether or not the exhaust gas sensor is to carry out an exhaust gas measurement at present, and whenever the vehicle is turned off and the dewpoint end signal simultaneously has the value which signals that the occurrence of liquid water in the exhaust system is no longer to be expected, and the measurement request signal simultaneously has the value which signals that the exhaust gas sensor is not to carry out an exhaust gas measurement at present, the sensor element is heated by the heating device to a temperature for a certain period of time in such a way that the sensor element dries.

3. A method for operating an exhaust gas sensor in an exhaust system of an internal combustion engine of a vehicle, the exhaust gas sensor including a ceramic sensor element having at least one measuring electrode and a heating device, the method comprising:

calculating, based on data relating to the internal combustion engine and the exhaust gas sensor, a binary dewpoint end signal, which indicates whether or not the occurrence of liquid water in the exhaust system is to be expected; and heating the sensor element by the heating device to a temperature for a certain period of time in such a way that the sensor element dries, whenever the vehicle is turned off and the dewpoint end signal simultaneously has a value which signals that an occurrence of liquid water in the exhaust system is still to be expected, and one or multiple further conditions are met at the same time, wherein, whenever the vehicle is turned off and the dewpoint end signal simultaneously has a value which signals that the occurrence of liquid water in the exhaust system is no longer to be expected, or the one condition is simultaneously not met, or the multiple conditions are simultaneously not met, the sensor element is no longer heated by the heating device.

4. The method as recited in claim 3, wherein, based on predefined criteria, a binary measurement request signal is calculated, which indicates whether or not the exhaust gas sensor is to carry out an exhaust gas measurement at present, and whenever the vehicle is turned off and the dewpoint end signal simultaneously has the value which signals that the occurrence of liquid water in the exhaust system is no longer to be expected, and the measurement request signal simultaneously has a value which signals that the exhaust gas sensor is not to carry out an exhaust gas measurement at present, and the one or multiple conditions are met, the sensor element is heated by the heating device to the temperature for the certain period of time in such a way that the sensor element dries.

5. The method as recited in claim 4, wherein, whenever the vehicle is turned off and the dewpoint end signal simultaneously has the value which signals that the occurrence of liquid water in the exhaust system is no longer to be expected, and the one or the multiple further conditions have simultaneously been met, and the measurement request signal simultaneously has the value which signals that the exhaust gas sensor is to carry out an exhaust gas measurement at present, the sensor element is no longer heated by the heating device.

6. The method as recited in claim 3, wherein the certain period of time is at least multiple seconds, and/or the temperature is at least 150° C.

7. The method as recited in claim 6, wherein the temperature is a 150° C. to 300° C.

8. The method as recited in claim 6, wherein the temperature is at least 175° C.

9. The method as recited in claim 6, wherein the temperature is 175° C. to 250° C.

10. The method as recited in claim 3, wherein the temperature is regulated to a constant value during the certain period of time.

11. A method for operating an exhaust gas sensor in an exhaust system of an internal combustion engine of a vehicle, the exhaust gas sensor including a ceramic sensor element having at least one measuring electrode and a heating device, the method comprising:
    calculating, based on data relating to the internal combustion engine and the exhaust gas sensor, a binary dewpoint end signal, which indicates whether or not the occurrence of liquid water in the exhaust system is to be expected; and
    heating the sensor element by the heating device to a temperature for a certain period of time in such a way that the sensor element dries, whenever the vehicle is turned off and the dewpoint end signal simultaneously has a value which signals that an occurrence of liquid water in the exhaust system is still to be expected, and one or multiple further conditions are met at the same time,
    wherein the further condition is one of the following conditions, or the multiple further conditions are multiple of the following conditions:
    a battery voltage of a battery, which is electrically connected to the exhaust gas sensor, is within a permissible range;
    an ambient temperature is below 5° C.;
    a total operating time of the exhaust gas sensor is no more than 100 hours or is no more than 300 hours;
    a shunt current, which was determined in a previous measurement phase, is no more than 1 µA.

12. The method as recited in claim 11, wherein the permissible range is above 12 V or above 12.4 V.

13. The method as recited in claim 10, wherein the total operating time of the gas sensor is no more than 100 hours when the dewpoint end signal has the value which signals that the occurrence of liquid water in the exhaust system is still to be expected, or is no more than 300 hours regardless of which value the dewpoint end signal has.

14. A non-transitory computer-readable medium on which is stored a computer program for operating an exhaust gas sensor in an exhaust system of an internal combustion engine of a vehicle, the exhaust gas sensor including a ceramic sensor element having at least one measuring electrode and a heating device, the computer program, when executed by a computer, causing the computer to perform the following steps:
    calculating, based on data relating to the internal combustion engine and the exhaust gas sensor, a binary dewpoint end signal, which indicates whether or not the occurrence of liquid water in the exhaust system is to be expected; and
    heating the sensor element by the heating device to a temperature for a certain period of time in such a way that the sensor element dries, whenever the vehicle is turned off and the dewpoint end signal simultaneously has a value which signals that an occurrence of liquid water in the exhaust system is still to be expected, and one or multiple further conditions are met at the same time, wherein, whenever the vehicle is turned off and the dew-point end signal simultaneously has the value which signals that the occurrence of liquid water in the exhaust system is no longer to be expected, and the measurement request signal simultaneously has the value which signals that the exhaust gas sensor is to carry out an exhaust gas measurement at present, the sensor element is no longer heated by the heating device.

15. An electronic control unit, which includes a non-transitory nonvolatile memory on which is stored a computer program for operating an exhaust gas sensor in an exhaust system of an internal combustion engine of a vehicle, the exhaust gas sensor including a ceramic sensor element having at least one measuring electrode and a heating device, the computer program, when executed by the electronic control unit, causing the electronic control unit to perform the following steps:
    calculating, based on data relating to the internal combustion engine and the exhaust gas sensor, a binary dewpoint end signal, which indicates whether or not the occurrence of liquid water in the exhaust system is to be expected; and
    heating the sensor element by the heading heating device to a temperature for a certain period of time in such a way that the sensor element dries, whenever the vehicle is turned off and the dewpoint end signal simultaneously has a value which signals that an occurrence of liquid water in the exhaust system is still to be expected, and one or multiple further conditions are met at the same time wherein, whenever the vehicle is turned off and the dew-point end signal simultaneously has the value which signals that the occurrence of liquid water in the exhaust system is no longer to be expected, and the measurement request signal simultaneously has the value which signals that the exhaust gas sensor is to carry out an exhaust gas measurement at present, the sensor element is no longer heated by the heating device.

* * * * *